United States Patent
Walker (10) Patent No.: US 10,153,068 B2
(45) Date of Patent: Dec. 11, 2018

(54) DIELECTRIC OR HEAT-TRANSFER FLUID COMPOSITIONS AND USES OF SAME

(71) Applicant: ARKEMA FRANCE, Colombes (FR)

(72) Inventor: Jeremie Walker, Ars sur Formans (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/906,066

(22) PCT Filed: Jul. 18, 2014

(86) PCT No.: PCT/FR2014/051858
§ 371 (c)(1),
(2) Date: Jan. 19, 2016

(87) PCT Pub. No.: WO2015/008004
PCT Pub. Date: Jan. 22, 2015

(65) Prior Publication Data
US 2016/0163412 A1    Jun. 9, 2016

(30) Foreign Application Priority Data

Jul. 19, 2013 (FR) ...................................... 13 57154

(51) Int. Cl.
*H01B 3/22* (2006.01)
*C09K 5/10* (2006.01)

(52) U.S. Cl.
CPC .......... *H01B 3/22* (2013.01); *C09K 5/10* (2013.01)

(58) Field of Classification Search
CPC .................................... H01B 3/22; C09K 5/10
(Continued)

(56) References Cited

U.S. PATENT DOCUMENTS 4,320,034 A * 3/1982 Lapp ...................... H01G 4/221
  252/567
4,523,044 A * 6/1985 Commandeur ......... C07C 2/861
  585/11

(Continued)

FOREIGN PATENT DOCUMENTS

EP    0 435 737 A1    7/1991

OTHER PUBLICATIONS

International Search Report (PCT/ISA/210) dated Sep. 29, 2014, by the European Patent Office as the International Searching Authority for International Application No. PCT/FR2014/051858.

(Continued)

*Primary Examiner* — Mark Eashoo
*Assistant Examiner* — Mohammad Reza-Asdjodi
(74) *Attorney, Agent, or Firm* — Buchanan Ingersoll & Rooney P.C.

(57) ABSTRACT

A composition including: (a) from 30 to 70% by weight of a mixture of benzyltoluene and dibenzyltoluene, and (b) from 70 to 30% by weight of at least one compound chosen from the C4-C8 aromatic compounds enclosing two benzene rings condensed or bonded to each other by a bond or by a spacer group other than —CH2-, the oligomers of same and the mixtures of same, excluding phenylxylylethane. Also, the use of this composition, with or without phenylxylylethane, depending on the case, as a dielectric and/or heat-transfer fluid, in particular in use conditions at very low temperatures, such as temperatures lower than −40° C., or indeed lower than −60° C. Also, mixtures of these compositions with mineral oils and/or natural or synthetic esters. Finally, devices, in particular electrical devices, incorporating this composition.

20 Claims, 3 Drawing Sheets

(58) Field of Classification Search
USPC .......................................................... 252/570
See application file for complete search history.

(56) References Cited

U.S. PATENT DOCUMENTS

| | | | | |
|---|---|---|---|---|
| 4,744,000 A * | 5/1988 | Mason | ................... | H01G 4/221 |
| | | | | 252/567 |
| 5,017,733 A * | 5/1991 | Sato | ......................... | H01B 3/22 |
| | | | | 174/17 LF |
| 5,192,463 A * | 3/1993 | Berger | ................... | C07C 2/861 |
| | | | | 252/570 |
| 5,850,055 A * | 12/1998 | Bosisio | ................... | B32B 27/10 |
| | | | | 174/120 C |
| 7,744,950 B2 * | 6/2010 | Belli | ........................ | H01B 3/20 |
| | | | | 427/117 |
| 2002/0139962 A1 * | 10/2002 | Fefer | ........................ | H01B 3/22 |
| | | | | 252/570 |
| 2002/0179890 A1 * | 12/2002 | Sletson | ................. | H01G 4/221 |
| | | | | 252/570 |
| 2016/0163412 A1 * | 6/2016 | Walker | .................... | H01B 3/22 |
| | | | | 252/570 |

OTHER PUBLICATIONS

Written Opinion (PCT/ISA/237) dated Sep. 29, 2014, by the European Patent Office as the International Searching Authority for International Application No. PCT/FR2014/051858.

* cited by examiner

DIELECTRIC OR HEAT-TRANSFER FLUID COMPOSITIONS AND USES OF SAME

TECHNICAL FIELD

The present invention relates to a composition comprising: (a) from 30 to 70% by weight of a mixture of benzyltoluene and dibenzyltoluene, and (b) from 70 to 30% by weight of at least one compound selected from the $C_{14}$-$C_{18}$ aromatic compounds containing two benzene rings that are fused or connected to one another by a bond or by a spacer group other than —$CH_2$—, oligomers thereof and mixtures thereof, with the exclusion of phenylxylylethane.

Another subject of the invention is the use of this composition, with or without phenylxylylethane depending on the case, as dielectric fluid and/or heat-transfer fluid, in particular under usage conditions at very low temperatures, such as temperatures below −40° C., or else below −60° C. The present invention also relates to mixtures of these compositions with mineral oils and/or natural or synthetic esters.

Finally, it relates to devices, especially electric devices, that incorporate this composition.

BACKGROUND OF THE INVENTION

Dielectric fluids are insulating materials conventionally used in certain electrical equipment such as high-voltage cables and transformers, in which they are impregnated on a solid material that acts as an insulator, such as a polypropylene film, optionally combined with a layer of paper, referred to as a "mixed film-paper" material. In transformers, these fluids also act as heat-transfer fluids. Dielectric fluids are also used in capacitors, where they make it possible to separate the conductive armatures and to thus prevent them coming into contact with one another and generating a short circuit. It is thus possible to manufacture high-capacity capacitors having a reduced size.

Various dielectric fluids have been marketed for replacing pyralenes (PCBs), which are chlorinated organic compounds considered to be persistent organic pollutants having effects that are harmful to human health and to the environment. They are essentially complex mixtures of hydrocarbons obtained by refining mineral oils derived from petroleum.

Thus, document U.S. Pat. No. 4,523,044 discloses a dielectric fluid consisting of a mixture comprising predominantly benzyltoluene oligomers, and also a small proportion of ditolylphenylmethane oligomers. A mixture of monobenzyltoluene and dibenzyltoluene is also available from ARKEMA under the trade name Jarylec® C101.

Document U.S. Pat. No. 4,744,000 describes the use, in capacitors, of dielectric fluids comprising phenylxylylethane in combination with phenyltolylmethanes, in particular with a mixture of monobenzyltoluene and dibenzyltoluene, and this being in particular for the purpose of obtaining improved performance with regard to the discharge inception voltage.

Lastly, document U.S. Pat. No. 5,017,733 describes the low-temperature electrical insulating capacity of various mixtures of oils containing bicyclic aromatic compounds. However, the oils used in this document do not comprise dibenzyltoluene.

Although the fluids of the prior art have a resistance to high voltages, which is characterized by a high partial discharge inception threshold and by a high rate of extinction of these discharges, their low-temperature behavior is not always satisfactory. This hinders their use in cold climates in particular. Thus, these fluids customarily have too high a viscosity at low temperature, which negatively affects the rate of diffusion of the gases (in particular of hydrogen), produced following a concentration of the electric field in certain zones of the device comprising these fluids. This results in an increase in the saturation level of the gas in the fluid, which generates bubbles leading to a partial discharge. This may result in a breakdown or in any case reduce the service life of the electrical device. In addition, these dielectric fluids have a tendency to crystallize at low temperature, which is also detrimental to the efficient operation of the electrical devices containing them.

Consequently, it would be desirable to be able to have a composition having a sufficiently low viscosity at low temperature, and a sufficiently low pour point, in order to be able to be used as a dielectric fluid at temperatures below −40° C., in particular below −60° C.

In addition, the low viscosity of these fluids would also make it possible to use them as heat-transfer fluids, especially in transformers.

The Applicant has discovered that these requirements could be satisfied by a composition containing, in addition to a mixture of benzyltoluene and dibenzyltoluene, at least one other specific compound.

SUMMARY OF THE INVENTION

A first subject of the present invention is thus a composition comprising: (a) from 30 to 70% by weight of a mixture of benzyltoluene and dibenzyltoluene, and (b) from 70 to 30% by weight of at least one compound selected from the $C_{14}$-$C_{18}$ aromatic compounds containing two benzene rings that are fused or connected to one another by a bond or by a spacer group other than —$CH_2$—, oligomers thereof and mixtures thereof, with the exclusion of phenylxylylethane.

Another subject of the present invention is the use of this composition as dielectric fluid and/or heat-transfer fluid, in particular for transformers, in particular power or instrument transformers or high-voltage transformers, high-voltage cables, capacitors, in particular high-voltage capacitors, bushings or on-load tap changers, rectifiers and harmonic filters.

Another subject of the invention is also the use of a composition comprising: (a) from 30 to 70% by weight of a mixture of benzyltoluene and dibenzyltoluene, and (b) from 70 to 30% by weight of at least one compound selected from the $C_{14}$-$C_{18}$ aromatic compounds containing two benzene rings that are fused or connected to one another by a bond or by a spacer group other than —$CH_2$—, oligomers thereof and mixtures thereof, as dielectric fluid and/or heat-transfer fluid at usage temperatures below −40° C., preferably −60° C., in particular for transformers, in particular power or instrument transformers or high-voltage transformers, high-voltage cables, capacitors, in particular high-voltage capacitors, bushings or on-load tap changers, rectifiers and harmonic filters.

Another subject of the invention is also devices, especially electrical devices, of the aforementioned type which comprise the composition according to the invention.

A final subject of the invention is also compositions that result for the most part from the mixture of (1) mineral oils and/or natural or synthetic esters, and (2) particular amounts of compositions according to the invention optionally containing phenylxylylethane.

DETAILED DESCRIPTION OF EMBODIMENTS

The composition according to the invention contains, as first constituent, a mixture of benzyltoluene (BT) and dibenzyltoluene (DBT). This mixture may be produced from commercial compounds taken separately or else obtained according to a process of condensation of the benzyl chloride with toluene in the presence of a Friedel-Crafts catalyst, followed by distillation. It is preferred for it to be prepared according to a process such as that described in document EP 0 435 737, which uses ferric chloride as catalyst. The reaction may be carried out at a temperature of 50 to 150° C. The reaction mixture obtained is generally treated in order to remove, on the one hand, the excess toluene by distillation and, on the other hand, the organic chlorinated products formed (for example by bringing into contact, at high temperature and under stirring, with an alcoholate).

The benzyltoluene may be in the form of any isomer, in particular selected from ortho- (CAS 713-36-0), para- (CAS 620-83-7) or meta-benzyltoluene and mixtures thereof (especially CAS 27776-01-8).

Use may be made of any isomer of dibenzyltoluene and mixtures thereof (CAS 26898-17-9).

It is preferred for the composition according to the invention (BT/DBT mixture+constituent (b)) to contain from 20 to 60% by weight of benzyltoluene and from 5 to 20% by weight, preferably from 5 to 15% by weight, of dibenzyltoluene, these percentages being expressed relative to the whole of the composition. It is also preferred to use, as constituent (a), a mixture of 15% by weight of dibenzyltoluene and 85% by weight of benzyltoluene or a mixture of 25% by weight of dibenzyltoluene and 75% by weight of benzyltoluene. A mixture of benzyltoluene and dibenzyltoluene is in particular commercially available from ARKEMA under the trade name Jarylec® C101.

The second constituent of this composition consists of at least one compound selected from the $C_{14}$-$C_{18}$ aromatic compounds containing two benzene rings that are fused or connected to one another by a bond or by a spacer group other than —$CH_2$—, oligomers thereof and mixtures thereof, it being understood that this compound cannot be phenylxylylethane.

Any isomer of such aromatic compounds may be used although, according to certain embodiments disclosed below, certain isomers are preferred.

"Fused" benzene rings are understood to mean benzene rings that are joined via two of their carbon atoms (naphthalene-type structure). According to one preferred embodiment of the invention, these benzene rings are not fused.

The composition according to the invention may comprise one or more of these compounds which may themselves be present in the form of one or more of their isomers. In the case where the constituent (b) comprises a mixture of monomer and oligomer(s), the monomer represents at least 50% by weight, at least 60% by weight, at least 70% by weight, or even at least 80% by weight, of this mixture.

The benzene rings may be, independently of one another, unsubstituted or substituted by one to three, and preferably one to two, $C_1$-$C_3$ alkyl groups, such as a methyl or isopropyl group, preferably a methyl group.

Two substituents of a benzene ring borne by adjacent carbon atoms may be connected to one another in order to form a ring, preferably a $C_6$ ring. As a variant, one substituent of a benzene ring and the adjacent spacer group may be connected to one another in order to form a ring.

Examples of spacer groups may be selected from —CH($CH_3$)—, —$CH_2$—$CH_2$— and —O— groups.

Examples of constituents (b) are:
diphenylethane (DPE) or isomers thereof, in particular 1,1-DPE (CAS 612-00-0), 1,2-DPE (CAS 103-29-7) and mixtures thereof (especially CAS 38888-98-1). DPE may be prepared by distillation of the distillation residues obtained during the production of ethylbenzene (EP 0 098 677). It is also commercially available;

ditolyl ether (DT) or isomers thereof, in particular those corresponding to the CAS numbers CAS 4731-34-4 and CAS 28299-41-4 and mixtures thereof. DT is in particular commercially available from LANXESS under the trade name DiphylDT;

phenylxylylethane (PXE) and isomers thereof, in particular those corresponding to the CAS numbers CAS 6196-95-8 and CAS 76090-67-0 and mixtures thereof. PXE is in particular commercially available from CHANGZHOU WINSCHEM under the trade name PXE oil;

1,2,3,4-tetrahydro(1-phenylethyl)naphthalene (CAS 63674-30-6), this product being commercially available, in particular from Dow under the reference Dowtherm RP;

diisopropylnaphthalene (CAS 38640-62-9), in particular commercially available from INDUS CHEMIE LIMITED under the trade name KMC 113;

and mixtures thereof.

Diphenylethane, and also isomers and oligomers thereof, are preferred as second constituent of the composition according to the invention. It is advantageous for 1,1-diphenylethane (CAS 612-00-0) to be the predominant compound. According to one particular embodiment, the constituent (b) is 1,1-diphenylethane (CAS 612-00-0).

In addition to the aforementioned constituents, this composition may contain at most 10% by weight, relative to the weight of the aforementioned constituents (a), of aromatic compounds, in the form of monomers, oligomers or a mixture of the two, such as ditolylphenylmethane. Such a compound is in particular present as a mixture with the constituent (a) according to the invention in the products Jarytherm BT06 and Jarytherm DBT sold by ARKEMA. These products may be prepared as described in document U.S. Pat. No. 4,523,044.

The composition according to the invention also advantageously has at least one, at least two, or even all of the following features:
a kinematic viscosity at 20° C. of less than 6 cSt, advantageously less than 5 cSt, and generally greater than 4 cSt,
a pour point of less than −65° C., or even less than −70° C.,
an absence of crystallization after storage for 3 months at −34° C.

According to another advantageous feature, combined partially or completely with the preceding features, the composition according to the invention also has an absence of crystallization after storage for 20 days at −60° C.

In addition, this composition generally has a flashpoint above or equal to 140° C.

As indicated previously, this composition may be used as a dielectric and/or heat-transfer fluid. This composition may also be used as a mixture with at least one mineral oil, preferably hydrogenated mineral oil, or else with a natural or synthetic ester, or mixtures thereof. In this case, the mixture thus obtained generally contains at most 20% by weight, preferably at most 15% by weight and more preferably still between 8 and 10% by weight of the composition. The mineral oil may be inhibited or uninhibited, according to the recommendations of the CEI 60296-4Ed standard. The mineral oil selected preferably has, in addition, a positive "gassing", according to the recommendations of the CEI 60628-A standard (tendency to produce gas). More specifically, gassing is a feature known for evaluating the tendency of a liquid insulator (oil) to absorb or, on the contrary, emit gas (hydrogen in particular) when this insulator is subjected to very high electrical stresses. The gassing value is positive if gas is released, and negative if gas is absorbed. It is generally sought to use compositions having a negative gassing, since this has a favorable effect on the usage properties of the systems containing them (limitation of problems linked to ionization in particular). However, it has been found that the addition of a composition according to the invention to an oil initially having a positive "gassing" (as measured according to the CEI 60628-A standard) made it possible to give the mixture obtained a negative gassing character. This constitutes another particularly interesting advantage in the possible uses of the compositions according to the invention.

The composition according to the invention may be used as insulating material in devices such as power or instrument transformers or high-voltage transformers, high-voltage cables, capacitors, in particular high-voltage capacitors, bushings or on-load tap changers, rectifiers, harmonic filters, and the like.

According to the invention, it is also possible to use a composition comprising: (a) from 30 to 70% by weight of a mixture of benzyltoluene and dibenzyltoluene, and (b) from 70 to 30% by weight of at least one compound selected from the $C_{14}$-$C_{18}$ aromatic compounds containing two benzene rings that are fused or connected to one another by a bond or by a spacer group other than —$CH_2$—, oligomers thereof and mixtures thereof, as dielectric fluid and/or heat-transfer fluid at usage temperatures below −40° C., preferably −60° C.

Still according to the invention, it is also possible to use a composition comprising: (a) from 30 to 70% by weight of a mixture of benzyltoluene and dibenzyltoluene, and (b) from 70 to 30% by weight of at least one compound selected from the $C_{14}$-$C_{18}$ aromatic compounds containing two benzene rings that are fused or connected to one another by a bond or by a spacer group other than —$CH_2$—, oligomers thereof and mixtures thereof, as dielectric fluid and/or heat-transfer fluid at usage temperatures below −40° C., preferably below −60° C., for transformers, in particular power or instrument transformers or high-voltage transformers, high-voltage cables, capacitors, in particular high-voltage capacitors, bushings or on-load tap changers, rectifiers and harmonic filters.

It will therefore be noted that, within the context of the last two particular uses above, the composition used may contain phenylxylylethane as constituent (b). For this purpose, it is possible to use phenylxylylethane (PXE) and isomers thereof, in particular those corresponding to the CAS numbers CAS 6196-95-8 and CAS 76090-67-0 and mixtures thereof. PXE is in particular commercially available from CHANGZHOU WINSCHEM under the trade name PXE oil.

Of course, in the case where use is made of a composition comprising phenylxylylethane, this composition will advantageously have some or all of the features defined above for the composition according to the invention which is free of phenylxylylethane.

The invention will be better understood in light of the following examples, which are given purely by way of illustration and the objective of which is not to limit the scope of the invention, defined by the claims.

EXAMPLES

In the following examples, the viscosities, pour point and crystallization tests were carried out in the following manner:

A. Determination of the Viscosities

The viscosity is determined with the aid of viscometer tubes for a composition at 20° C. The principle lies in the measurement of the flow rate fluid in a calibrated tube in a given time window.

Figure 1:
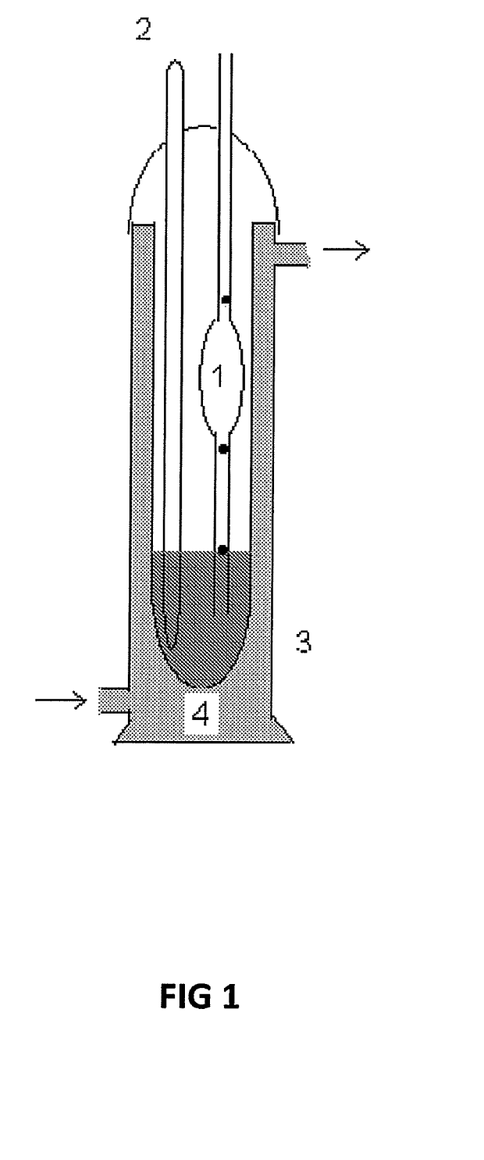

Use is made of a thermostatically-controlled bath, a stopwatch and a glass assembly, which is jacketed for control, combined with a viscometer tube and a round-bottomed flask for placing the sample. This assembly is represented in FIG. 1, in which (1) is the viscometer tube, (2) is the thermometer, (3) is the glass assembly of cylindrical shape for stabilizing the measurement temperature and (4) is a silicone oil (T°>100° C.) or water which are fluid at the measurement temperature.

The thermostatically-controlled bath is set at 20° C. Around 50 ml of sample are drawn into the round-bottomed flask provided for this purpose. This round-bottomed flask is introduced into the glass assembly. The viscometer tube is selected in a manner suited to the viscosity to be measured. A viscometer tube with a 0.77 diameter was used. This tube is placed in the chamber and is positioned so that the level of the product to be measured is at the height of the intermediate point (marker), at the bottom of the tube. The thermometer is introduced. When the sample is at 20° C., it is sucked into the viscometer tube with the aid of a pipette filler until it is above the upper point. The product is then allowed to flow by removing the pipette filler. When the product arrives at the upper point, the stopwatch is started until the product arrives at the second point.

The time that the product has taken to flow from the upper point to the second point is noted.

For each sample, 3 measurements are taken and the average of the 3 measurements is calculated.

The formula for calculating the viscosity of a fluid is the following:

$$\eta = K \times t$$

in which:
η: viscosity in centistokes cSt.
K: gravity calibration constant.
t: flow time of the sample, in seconds, between the two markers under the effect of gravity.

In this particular case, the constant of the 0.77 tube is 0.02388.

B. Determination of the Pour Point

The temperature corresponding to a given viscosity of the mixtures, for which the mixtures are no longer at all fluid, is determined.

Use is made of an Anton Paar Physica MCR 301 rheometer equipped with the cooling chamber cooled by liquid nitrogen, of reference CTD 450 L, with a measurement geometry of 25 plate/plate type.

Measurement parameters:
Rotational speed of the spindle: 1 rpm
Number of points/test: 180
Temperature program: cooling from −30° C. to −80° C. with a ramp of 2° C./min The pour temperature was set in the following manner: it is the temperature corresponding to a viscosity of 50 000 Pa·s.

C. Tests of Crystallization in Tubes

The samples are subjected to thermal cycles with or without stirring and/or seeding with crystals, in order to give rise to a crystallization.

The tests are carried out by means of:
Zanussi freezer: down to −34.0° C.
CLIMATS climatic chamber: down to −60° C.

Figure 2:
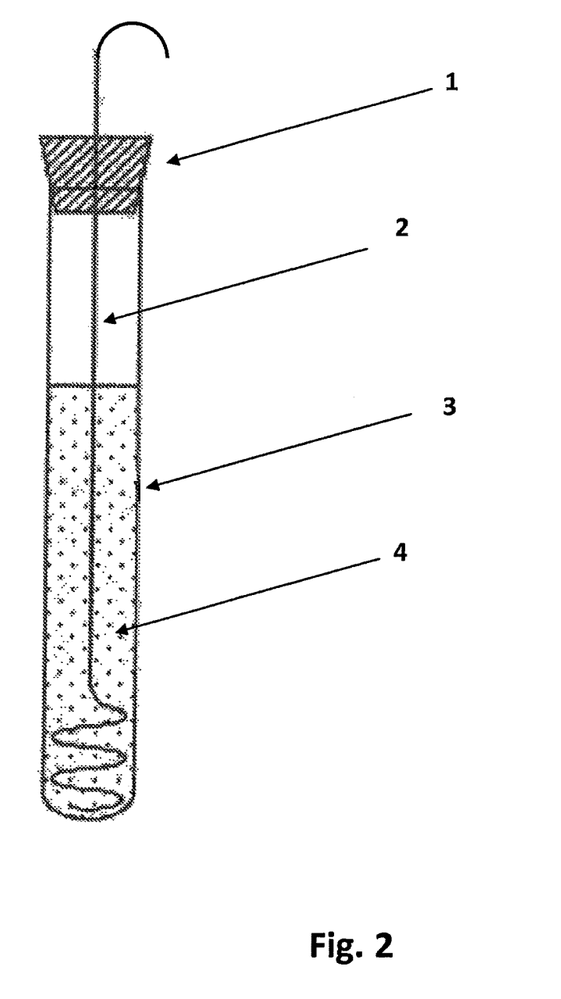

Test tubes stoppered with unpierced stoppers (identical to the diagram given in FIG. 2)

Test tubes provided with stoppers and stirrers (according to the diagram given in FIG. 2)

In this FIG. 2: (1) represents a silicone stopper having a lower diameter of 14.5 mm and having an upper diameter of 17 mm; (2) represents a stirring rod having a diameter of 1.5 mm; (3) represents a test tube having an internal diameter of 15 mm and an external diameter of 17 mm with a height of 180 mm; (4) represents the liquid being tested.

The silicone stoppers were pierced using a 5 mm diameter cork borer.

The stirring rod ends in two coils with a diameter of 11 to 13 mm, depending on the rods, and that are around 5 mm apart.

The test tubes containing the samples are placed either in a freezer, or in the climatic chamber.

The stirring is carried out by actuating the rod vertically, three to four times, and by rubbing the walls of the tube.

Figure 3:
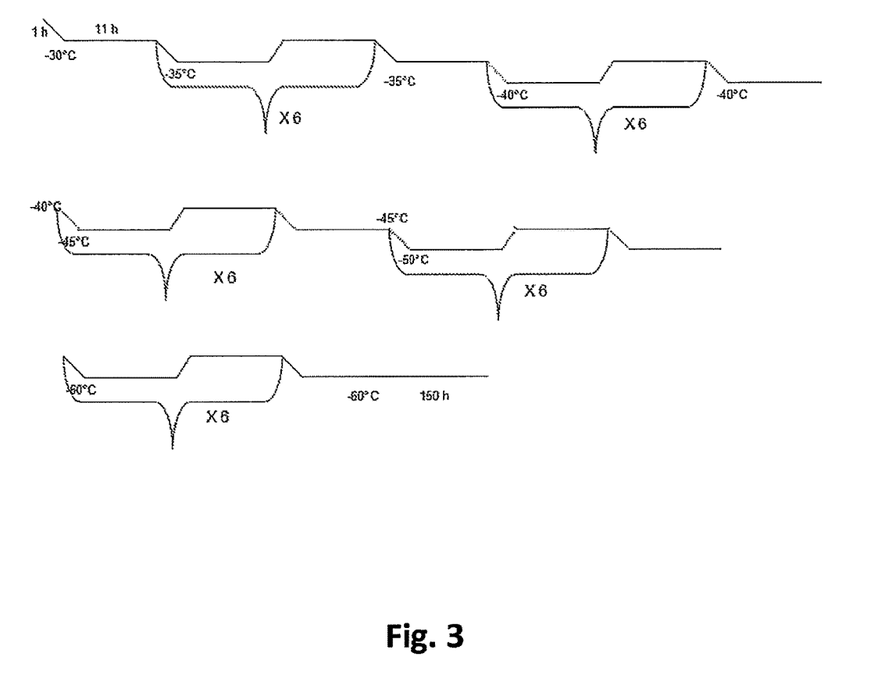

The samples may be subjected to temperature cycles. The exact temperature cycles ranging from −25° C. to −60° C. are given in FIG. 3, and are the following:

The samples at −25° C. are cooled over one hour in order to reach −30° C. After 11 h at −30° C., the samples are cooled over one hour in order to reach −35° C. After 11 h at −35° C., the samples are reheated over one hour to −30° C., and will remain at −30° C. for 11 h, before again being cooled over one hour to −35° C. The samples will, in total, be cooled to −35° C. then reheated in this way to −30° C., six times.

After the sixth cycle, the samples are cooled over one hour to −35° C., and remain at −35° C. for 11 h, before again being cooled over one hour to −40° C. After 11 h at −40° C., the samples are reheated over one hour to −35° C., and will remain at −35° C. for 11 h, before again being cooled over one hour to −40° C. The samples will, in total, be cooled to −40° C. then reheated in this way to −35° C., six times.

This process is carried out again in order to cool the samples from −40° C. to −45° C., then from −45° C. to −50° C., and finally from −50° C. to −60° C., in order to finish by maintaining the samples at −60° C. for 150 h.

These samples may also, depending on the case, be seeded with monobenzyltoluene crystals. For this, monobenzyltoluene crystals are introduced into the samples with the aid of a 5 mm-wide flat spatula.

The tubes are then observed regularly and any visual change is noted.

Example 1

Various dielectric fluids according to the invention, denoted hereinbelow by Mix 113 to Mix 117, and also comparative dielectric fluids, comprising only the constituent (a) according to the invention (Jarylec® C101) or this as a mixture with less than 30% by weight of constituent (b) (Mix 111 and Mix 112), were prepared.

In order to do this, the product Jarytherm BT06 from ARKEMA was distilled so as to obtain virtually pure benzyltoluene, which was then mixed with dibenzyltoluene supplied by ARKEMA, in a weight ratio of the benzyltoluene to the dibenzyltoluene of 85:15. The constituent (a) according to the invention was thus obtained. This was mixed with at least one constituent (b) according to the invention. In the first series, this was 1,1-DPE, supplied by JX NIPPON TEXAS CHEMICAL.

The following was then evaluated, for each of these fluids:

the pour point: for this a viscosity measurement was carried out for a sample of fluid using an Anton Paar model MCR301 dynamic shear rheometer with plate-plate geometry, equipped with a nitrogen cooling system. The sample was placed between the two parallel plates of the rheometer at ambient temperature and was gradually cooled to −80° C. at a rate of 2° C./min. A shear rate of 1.3 s$^{-1}$ was applied to the sample. Its pour point was noted at the appearance of the first discontinuity in the viscosity values during the cooling (in other words before the sample became too viscous to be able to measure the viscosity thereof);

the kinematic viscosity at 20° C.; for this the flow rate of the fluid was measured using a calibrated viscometer tube;

the absence of crystallization; for this the fluid was placed in a refrigerated chamber at a temperature of −34° C. for 90 days, while seeding the fluid with BT crystals on the 4$^{th}$, 11$^{th}$, 19$^{th}$, 54$^{th}$, and 89$^{th}$ day.

The composition of the fluids tested, and also the results of the aforementioned tests, are assembled in the tables below:

TABLE I

| | Formulation (proportion) | Pour point (° C.) | Viscosity (° C./cSt) | Crystallization at −34° C. |
|---|---|---|---|---|
| Jarylec ® C101 (comparative) | BT/DBT (75/25) | −72.4 | 20.0/6.50 | presence of crystals after 18 days |
| Mix 111 (comparative) | BT/DBT/ 1,1-DPE (76.5/13.5/10) | −76 | 20.2/4.99 | presence of crystals after 22 days |
| Mix 112 (comparative) | BT/DBT/ 1,1-DPE (68/12/20) | −75.7 | 20.5/4.94 | presence of crystals after 22 days |
| Mix 113 | BT/DBT/ 1,1-DPE (59.5/10.5/30) | −75.7 | 20.4/4.94 | absence of crystals after 90 days |
| Mix 114 | BT/DBT/ 1,1-DPE (51/9/40) | −76 | 20.4/4.97 | absence of crystals after 90 days |
| Mix 115 | BT/DBT/ 1,1-DPE (42.5/7.5/50) | −76 | 20.2/4.94 | absence of crystals after 90 days |

TABLE II

| | Formulation (proportion) | Pour point (° C.) | Viscosity (° C./cSt) | Crystallization at −34° C. |
|---|---|---|---|---|
| Jarylec ® C101 (comparative) | BT/DBT (75/25) | −65.5 | 20.0/6.50 | presence of crystals after 11 days |
| Mix 116 | BT/DBT/ 1,1-DPE (30/10/60) | −67.9 | 19.9/5.30 | absence of crystals after 90 days |
| Mix 117 | BT/DBT/ 1,1-DPE (22.5/7.5/70) | −68.7 | 19.8/5.20 | absence of crystals after 90 days |

It is observed that only the compositions according to the invention make it possible to simultaneously achieve a kinematic viscosity of less than 6 cSt at 20° C., a pour point below −65° C. and an absence of crystallization at −34° C.

Example 2

The procedure of example 1 was followed, while preparing and evaluating various dielectric fluid compositions which differ from one another due to the nature of their ingredients and/or the relative weight proportions of the latter. In the following tables, the abbreviations that appear have the following meanings:
BT: benzyltoluene
DBT: dibenzyltoluene
1,1-DPE: 1,1-diphenylethane
KMC113: diisopropylnaphthalene
DiphylDT: ditolyl ether The features desired for the compositions were the following:

Kinematic viscosity <6 cSt at 20° C.

Pour point <−65° C., or even <−70° C.

No crystallization at −34° C. for 3 months

No crystallization at −60° C. for 20 days

The results of the tests are recorded in table III (isothermal temperature at −34° C. and −60° C.) and in table IV (temperature cycle from −25° C. to −60° C.) given below. In the two tables, the isotherms at −60° C. (with or without prior cycle) were maintained for 20 days.

TABLE III

Isothermal crystallization tests at −34° C. and at −60° C. without and with stirring

| Name | Formulation | Proportion | Viscosity (cSt) at 20° C. | Pour Point (° C.) | Crystallization −34° C. isotherm | −34° C. isotherm with stirring and seeding (1) | −60° C. isotherm | −60° C. isotherm after stirring (2) |
|---|---|---|---|---|---|---|---|---|
| TM5  | 1.1-DPE/BT/DBT   | 10/76.5/13.5 | 4.99 | −77.6 | no | 100% | no | 50% |
| TM6  | 1.1-DPE/BT/DBT   | 20/68/12     | 4.94 | −77.4 | no | 75%  | no | no  |
| TM7  | 1.1-DPE/BT/DBT   | 30/59.5/10.5 | 4.94 | −77.4 | no | 15%  | no | no  |
| TM8  | 1.1-DPE/BT/DBT   | 40/51/9      | 4.97 | −77.7 | no | no   | no | no  |
| TM9  | 1.1-DPE/BT/DBT   | 50/42.5/7.5  | 4.94 | −77.6 | no | no   | no | no  |
| TM12 | 1.1-DPE/BT/DBT   | 30/52.5/17.5 | 5.74 | −75.2 | no | —    | no | no  |
| TM13 | 1.1-DPE/BT/DBT   | 40/45/15     | 5.60 | −75.7 | no | —    | no | no  |
| TM14 | 1.1-DPE/BT/DBT   | 50/37.5/12.5 | 5.47 | −76.2 | no | —    | no | no  |
| TM41 | 1.1-DPE/BT/DBT   | 60/30/10     | 5.28 | −76.0 | no | —    | —  | —   |
| TM25 | KMC113/BT/DBT    | 30/59.5/10.5 | 5.79 | −74.9 | no | —    | no | no  |
| TM27 | DiphylDT/BT/DBT  | 40/45/15     | 5.83 | −71.3 | no | —    | no | no  |
| TM28 | DiphylDT/BT/DBT  | 30/52.5/17.5 | 5.83 | −72.0 | no | —    | no | no  |
| TM30 | DiphylDT/BT/DBT  | 40/51/9      | 5.31 | −72.9 | no | —    | no | no  |
| TM31 | DiphylDT/BT/DBT  | 30/59.5/10.5 | 5.24 | −74.3 | no | —    | no | no  |

(1) series of tests at −34° C. with stirring and seeding.
(2) for tests at −60° C., the seedings are not carried out in order to avoid water entering the tubes which would distort the tests by forming crystals.

TABLE IV

Crystallization tests with temperature cycles from −25° C. to −60° C.

| Name | Formulation | Proportion | Viscosity (cSt) at 20° C. | Pour Point (° C.) | Crystallization Temperature cycles | Temperature cycles + −60° C. isotherm (3) | Temperature cycles + −60° C. isotherm after stirring (4) |
|---|---|---|---|---|---|---|---|
| TM5  | 1.1-DPE/BT/DBT   | 10/76.5/13.5 | 4.99 | −77.6 | crystals on rod | crystals on rod | 75% |
| TM7  | 1.1-DPE/BT/DBT   | 30/59.5/10.5 | 4.94 | −77.4 | no | no | no |
| TM8  | 1.1-DPE/BT/DBT   | 40/51/9      | 4.97 | −77.7 | no | no | no |
| TM9  | 1.1-DPE/BT/DBT   | 50/42.5/7.5  | 4.94 | −77.6 | no | no | no |
| TM39 | 1.1-DPE/BT/DBT   | 60/34/6      | 4.93 | −77.1 | no | no | no |
| TM40 | 1.1-DPE/BT/DBT   | 70/25.5/4.5  | 4.97 | −77.3 | no | no | no |
| TM12 | 1.1-DPE/BT/DBT   | 30/52.5/17.5 | 5.74 | −75.2 | no | no | no |
| TM13 | 1.1-DPE/BT/DBT   | 40/45/15     | 5.60 | −75.7 | no | no | no |
| TM14 | 1.1-DPE/BT/DBT   | 50/37.5/12.5 | 5.47 | −76.2 | no | no | no |
| TM41 | 1.1-DPE/BT/DBT   | 60/30/10     | 5.28 | −76.0 | no | no | no |
| TM25 | KMC113/BT/DBT    | 30/59.5/10.5 | 5.79 | −74.9 | no | no | no |
| TM27 | DiphylDT/BT/DBT  | 40/45/15     | 5.83 | −71.3 | no | no | no |
| TM28 | DiphylDT/BT/DBT  | 30/52.5/17.5 | 5.83 | −72.0 | no | no | no |
| TM30 | DiphylDT/BT/DBT  | 40/51/9      | 5.31 | −72.9 | no | no | no |
| TM31 | DiphylDT/BT/DBT  | 30/59.5/10.5 | 5.24 | −74.3 | no | no | no |

(3) at the end of the 2nd test, the −60° C. isotherm is maintained for 20 days without stirring
(4) at the end of the −60° C. isotherm, the tubes equipped with a stirrer are stirred manually then maintained at −60° C. for 9 days

Example 3

The objective of this example is to illustrate the influence of a composition according to the invention on the gassing properties of a known insulating mineral oil. The gassing measurements were carried out according to the CEI 60628-A standard.

The mineral oil used is sold under the commercial reference "Nytro Gemini X" by NYNAS, and is in the form of a mixture of the following composition (the percentages are by weight):

Distillates (petroleum), hydrotreated light naphthenic: 50-100% (CAS 64742-53-6)

Distillates (petroleum), hydrotreated light paraffinic: 0-50% (CAS 64742-55-8)

Lubricating oils (petroleum), C20-50, hydrotreated neutral oil-based: 0-50% (CAS 72623-87-1)

Distillates (petroleum), hydrotreated heavy paraffinic: 0-50% (CAS 64742-54-7) 2,6-di-tert-butyl-p-cresol: <0.4% (CAS 128-37-0)

This mineral oil alone displays a positive gassing of +10 µl/min, which means that it is not capable of absorbing hydrogen resulting from electrical faults such as partial discharges inside the equipment.

Added to this reference oil is 8% by weight of the composition TM9 from example 2, namely a composition in accordance with the invention, having the following composition: 1.1-DPE/BT/DBT in a weight ratio of 50/42.5/7.5.

The mixture obtained displays a negative gassing of −17 µl/min, i.e. the addition of a small amount (8%) of a composition according to the invention reverses the gassing tendency of the reference oil.

The invention claimed is:

1. A method comprising operating an electrical device at a temperature below −40° C.,
    wherein the electric device comprises a composition as dielectric fluid and/or heat-transfer fluid, the composition comprising:
    (a) from 30 to 70% by weight of a mixture of benzyltoluene and dibenzyltoluene, wherein the composition contains from 20 to 60% by weight of benzyltoluene and from 5 to 20% by weight of dibenzyltoluene, relative to the total weight of the composition; and
    (b) from 70 to 30% by weight of at least one compound selected from the $C_{14}$-$C_{18}$ aromatic compounds containing two benzene rings that are fused or connected to one another by a bond or by a spacer group other than —$CH_2$—, oligomers thereof and mixtures thereof.

2. The method as claimed in claim 1, wherein the electric device is selected from transformers, high-voltage cables, capacitors, bushings, on-load tap changers, rectifiers, or harmonic filters.

3. The method as claimed in claim 1, wherein the composition contains from 5 to 15% by weight of dibenzyltoluene, relative to the total weight of the composition.

4. The method as claimed in claim 1, the method comprising utilizing the composition as dielectric fluid and/or heat-transfer fluid at usage temperatures below −60° C.

5. The method as claimed in claim 1, wherein the constituent (b) is 1,1-diphenylethane.

6. The method as claimed in claim 1, wherein the composition has the feature of an absence of crystallization after storage for 3 months at −34° C.

7. A composition comprising:
    (a) from 30 to 70% by weight of a mixture of benzyltoluene and dibenzyltoluene, wherein the composition contains from 20 to 60% by weight of benzyltoluene and from 5 to 20% by weight of dibenzyltoluene, relative to the total weight of the composition; and
    (b) from 70 to 30% by weight of at least one compound selected from the $C_{14}$-$C_{18}$ aromatic compounds containing two benzene rings that are fused or connected to one another by a bond or by a spacer group other than —$CH_2$—, oligomers thereof and mixtures thereof, wherein the compound (b) does not comprise phenylxylylethane.

8. The composition as claimed in claim 7, wherein the constituent (b) comprises a mixture of monomer and oligomer(s), and in that the monomer represents at least 50% by weight of this mixture.

9. The composition as claimed in claim 8, wherein the benzene rings are substituted by at least two substituents borne by adjacent carbon atoms, connected to one another in order to form a ring.

10. The composition as claimed in claim 9, wherein the spacer group is selected from —$CH(CH_3)$—, —$CH_2$—$CH_2$— and —O— groups.

11. The composition as claimed in claim 10, wherein it has at least one of the following features:
    a kinematic viscosity at 20° C. of less than 6 cSt,
    a pour point of less than −65° C.,
    an absence of crystallization after storage for 3 months at −34° C.

12. The composition as claimed in claim 11, wherein the composition additionally has an absence of crystallization after storage for 20 days at −60° C.

13. The composition as claimed in claim 7, wherein the benzene rings are substituted by one to three $C_1$-$C_3$ alkyl groups.

14. The composition as claimed in claim 13, wherein one substituent of a benzene ring and the adjacent spacer group are connected to one another in order to form a ring.

15. The composition as claimed in claim 14, wherein the constituent (b) is selected from: diphenylethane, ditolyl ether, diisopropylnaphthalene, 1,2,3,4-tetrahydro(1-phenylethyl)naphthalene, mixtures thereof, any isomer or oligomer thereof or mixtures thereof.

16. A device selected from the group consisting of power or instrument transformers or high-voltage transformers, high-voltage cables, capacitors, bushings, on-load tap changers, rectifiers and harmonic filters, wherein the device comprises a composition as claimed in claim 7.

17. A mixture consisting of:
    (i) at least 80% by weight of said mixture, of a mineral oil and/or a natural or synthetic ester, and
    (ii) the composition as defined in claim 7.

18. The composition as claimed in claim 7, wherein the composition contains from 5 to 15% by weight of dibenzyltoluene, relative to the total weight of the composition.

19. The composition as claimed in claim 7, wherein the constituent (b) is s 1,1-diphenylethane.

20. The composition as claimed in claim 7, wherein the composition has the feature of an absence of crystallization after storage for 3 months at −34° C.

* * * * *